Figure 1:
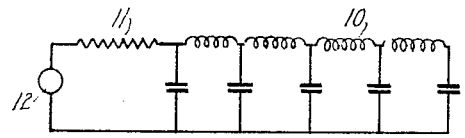

March 13, 1951  A. D. BLUMLEIN  2,545,018
APPARATUS FOR GENERATING ELECTRICAL PULSES
Filed Dec. 8, 1945  2 Sheets-Sheet 1

INVENTOR
ALAN D. BLUMLEIN, DECEASED
BY DOREEN WALKER, EXECUTRIX
BY H.S. Grover
ATTORNEY

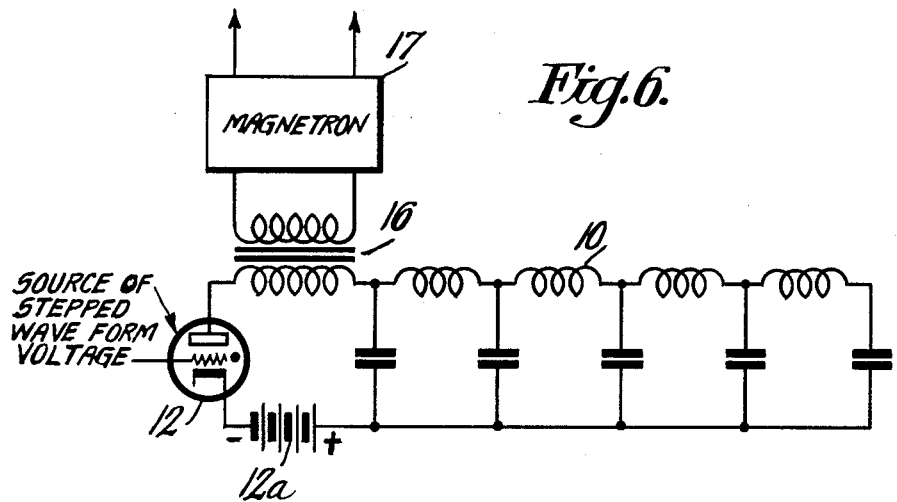
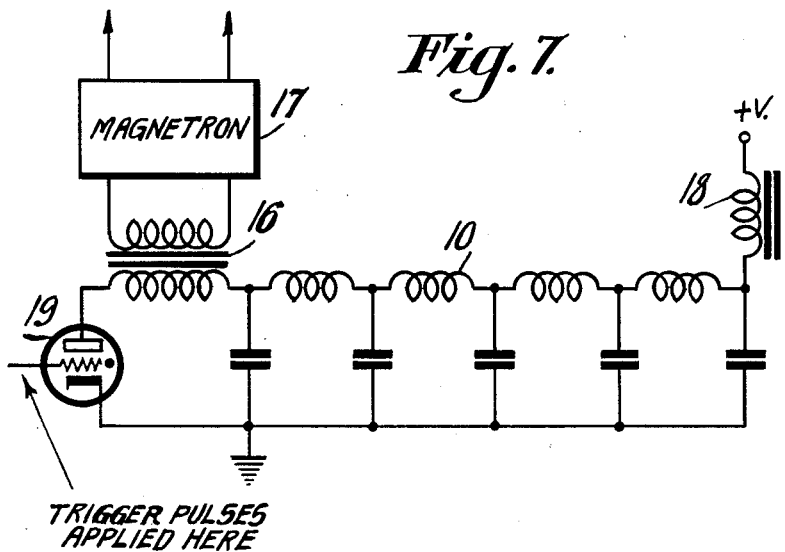

Patented Mar. 13, 1951

2,545,018

UNITED STATES PATENT OFFICE 2,545,018

APPARATUS FOR GENERATING ELECTRICAL PULSES

Alan Dower Blumlein, deceased, late of Ealing, London, England, by Doreen Walker, executrix, Lanherne, Lescudjack, Penzance, Cornwall, England, assignor to Electric & Musical Industries Limited, Hayes, England, a company of Great Britain Application December 8, 1945, Serial No. 633,832
In Great Britain October 28, 1941

Section 1, Public Law 690, August 8, 1946
Patent expires October 28, 1961

9 Claims. (Cl. 250—27)

This invention relates to apparatus mainly for the generation of impulsive waveforms of current or potential of a desired shape using delay networks.

For generating short impulses of electrical energy it has previously been proposed to use a delay network line connected at one end across the anode load of a valve and short-circuited at the other so as to produce pulses of short duration from pulses of anode current of longer duration. For purposes of pulse modulation it has been proposed to use an open-circuited delay network, the latter being charged to a uniform potential along its length and then being discharged through the load. In general, delay networks if composed of many identical sections, produce impulses having a flat-topped waveform. Impulses of this particular waveform are often very desirable, especially when the pulses are required to modulate a device such as a magnetron oscillator whose frequency is dependent upon the input current. If, however, a magnetron is fed with pulses of flat-topped waveform, such as are generated by the lines above referred to, through a device such as a transformer, the varying magnetising current taken by the transformer causes the input current to the magnetron to change which, in turn, causes a drift or modulation in frequency of the magnetron which is undesirable.

It is evident therefore that the shape of the waveform which should be fed to the transformer is other than flat-topped, but should, nevertheless, be such that after the waveform has passed through the transformer a flat-topped waveform results for application to the magnetron.

The object of the present invention is to provide an improved apparatus whereby waveforms of a desired shape can be generated, the invention being suitable for use for overcoming or reducing the above-mentioned disadvantage and other purposes.

According to one feature of the invention, apparatus is provided for generating electrical variations or impulses comprising a delay network, means for feeding electrical energy thereto and a load in which derived electrical variations or impulses are generated, the characteristic impedance of said network varying along its length and one end of said network being misterminated so as to provide substantial reflections from such end during operation whereby derived variations or impulses are generated of a desired form.

Where it is desired to apply to a load, such as a magnetron, impulsive waveforms of a predetermined shape and said derived waveforms are fed from said network to said load through means which distorts the shape of said derived waveforms, it is arranged that the derived waveforms are of such a shape that, after distortion by said means, the waveforms are of said predetermined shape.

The invention may also be employed where it is desired to control the rate of discharge of a network at the beginning of a pulse so as to limit the rate of rise of current in a discharge device, such as is known by the registered trademark "Thyratron."

According to another feature of the invention there is provided apparatus for transmitting electrical signals, said apparatus comprising means which distorts said signals and a delay network the characteristic impedance of which varies along its length and one end of said network being so terminated as to provide substantial reflections from such end during operation, the arrangement serving to compensate wholly or in part said distortion.

Figure 2:
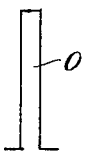
Figure 3:
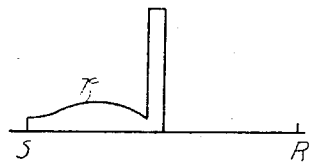
Figure 4:
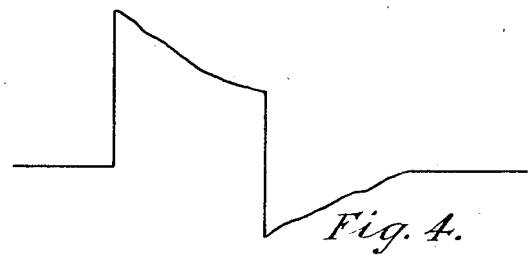
Figure 5:
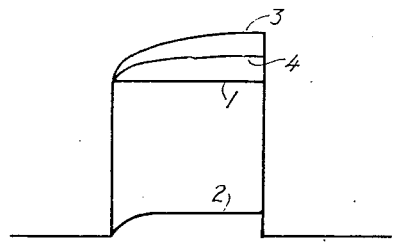

In order that the said invention may be clearly understood and readily carried into effect, it will now be more fully described with reference to the accompanying drawings, in which:

Figure 1 illustrates diagrammatically apparatus in accordance with the invention, Figures 2 and 3 are illustrative of the mode of operation of said apparatus, Figure 4 shows a typical impulsive waveform such as may be generated by said apparatus, Figure 5 shows impulsive waveforms which can be generated by said apparatus for feeding current to a magnetron oscillator through a transformer, and Figures 6 and 7 illustrate diagrammatically apparatus in accordance with certain embodiments of the invention.

Referring to Figure 1, there is shown for generating impulses of a desired shape in a load, a delay network 10 whose impedance Z varies along its delay length in accordance with the invention. The network 10 is terminated at one end through an impedance 11 and a source of potential 12 which is arranged to generate intermittently a waveform of potential or current and which feeds to 10 the electrical energy so generated. The impedance 11 is the sum of the load and the source impedances and is arranged to be equal to the impedance presented to it by the network 10 and will be supposed to constitute the whole of the impedance terminating the network 10. The end of the network remote from the source 12 is as shown misterminated by an open circuit or a short circuit so as to provide substantial reflections during operation. The impedance of the network 10 at any point may be represented by $$Z_0 f\left(\frac{t}{2}\right)$$

where $$\frac{t}{2}$$

is the time delay between the point in question and the end terminated by the impedance 11 and source 12. This time delay is the sum of all the quantities $\sqrt{LC}$ for all elementary sections of the network between the point in question and the terminated end, L being the magnitude of the series inductance element of a section and C being the magnitude of the shunt capacitative element of the section. The impedance of the network at the terminated end will be $$Z_0 f(0)$$

This must be the magnitude of the terminating impedance 11. Now the characteristic impedance of the network at any point is given by:

$$\sqrt{\frac{L}{C}}$$

Suppose that the source of potential 12 generates across the terminated end of the network a rectangular impulse of, for convenience, unit magnitude indicated by O, Figure 2, lasting for a very short period $\Delta t$, and suppose that when this impulse has reached the point on the network 10 where the impedance is $$Z_0 f\left(\frac{t}{2}\right)$$

that it possesses the magnitude represented by V. This condition is illustrated diagrammatically in Figure 3 where SR represents the length of the network, S being the end to which the source is connected and R being the end remote from the source. The pulse O starting as an impulse of unit magnitude at S has travelled in time $$\frac{t}{2}$$

to its position as shown where its amplitude by a process of continual transformation has become V. At the position shown the impedance of the network is $$Z_0 f\left(\frac{t}{2}\right)$$

In further time $\Delta t$ the impulse will have passed to the point where the impedance is $$Z_0 f\left(\frac{t + \Delta t}{2}\right)$$

Corresponding to this change of impedance a reflected wave will be set up of amplitude:

$$V \cdot \frac{Z_0 f\left(\frac{t+\Delta t}{2}\right) - Z_0 f\left(\frac{t}{2}\right)}{Z_0 f\left(\frac{t+\Delta t}{2}\right) + Z_0 f\left(\frac{t}{2}\right)}$$

that is to say, in the limit when $\Delta t$ is made very small a wave will be returned or scattered back to the terminated end of amplitude:

$$V \cdot \frac{f'\left(\frac{t}{2}\right)}{f\left(\frac{t}{2}\right)} \cdot \frac{\Delta t}{4}$$

This reflected wave will be changed in amplitude in inverse ratio, but to the same degree, as the impulse which arrived at the point in question on the network was changed in passing from the source to that point. Thus as the impulse of magnitude V travels along the line from S to R there appears at the end S a continuous succession of impulses of magnitude $$\frac{f'\left(\frac{t}{2}\right)}{f\left(\frac{t}{2}\right)} \left(\frac{\Delta t}{4}\right)$$

$t$ representing the time at which each impulse arrives at S. The distribution of potential between the position of the impulse at time $$\frac{t}{2}$$

and the source due to the presence of the succession of scattered impulses flowing back to the source along the network is indicated in Figure 3 by the envelope $r$.

If instead of generating a very short duration rectangular impulse as just supposed, the source 12 generates a step potential of unit magnitude, the step commencing at time $t=0$, then the source may be regarded as emitting a continuous succession of short-duration rectangular pulses of unit amplitude. Each of these will give rise to a continuous stream of reflected impulses back upon the source. At time $t$ the sum total of these scattered impulses present at the terminated end will be $$\sum \frac{f'\left(\frac{t}{2}\right)}{f\left(\frac{t}{2}\right)} \frac{\Delta t}{4}$$

that is to say, in the limit when $\Delta t$ is made infinitesimally small, the integral $$\int_0^t \frac{f'\left(\frac{t}{2}\right)}{f\left(\frac{t}{2}\right)} \cdot \frac{dt}{4} = \frac{1}{2} \log \frac{f\left(\frac{t}{2}\right)}{f(0)}$$

The resultant potential difference developed across the impedance 11 will thus be $$1 - \frac{1}{2} \log \frac{f\left(\frac{t}{2}\right)}{f(0)}$$

This will be the resultant potential difference developed across the load connected to the network if the impedance 11 represents the load, and the source or effective source 12 is of zero impedance.

If the total delay of the network is $$\frac{T}{2}$$

then the above formula for the reflected wave across the terminated end of the network superposed upon the incident step wave will hold generally for all values of $t$ up to $T$. Since the network is misterminated at the end remote from the source 12, there will arrive at time $T$ back at the source by reflection from the misterminated end the first of the succession of short-duration impulses emitted by the source. Each of the short-duration impulses reflected back from the remote end will give rise on its way back to the source to further small scattered impulses at each point along the length of the network which will travel up to the misterminated end and then reflect back to the source. Since on the way back to the source the gradient of impedance along the network will be of reverse sign to that for propagation up the network, the reflected impulses travelling to the misterminated end will be of opposite sign to those which are reflected back to the source in the way first considered. Thus, at time $t$, subsequent to time $T$, if the mistermination gives rise to in-phase complete reflection, the total reflected waveform by scattering, omitting the end reflection of the main step, is the sum $$\sum \frac{f'\left(\frac{t}{2}\right)}{f\left(\frac{t}{2}\right)} \cdot \frac{\Delta t}{4} - \sum \frac{f'\left(T-\frac{t}{2}\right)}{f\left(T-\frac{t}{2}\right)} \frac{\Delta t}{4}$$

As $\Delta t$ approaches 0, this becomes $$\int_0^T \frac{f'\left(\frac{t}{2}\right)}{f\left(\frac{t}{2}\right)} \frac{dt}{4} - \int_T^t \frac{f'\left(T-\frac{t}{2}\right)}{f\left(T-\frac{t}{2}\right)} \frac{dt}{4} = \frac{1}{2} \log \frac{f\left(T-\frac{t}{2}\right)}{f(0)}$$

After time $2t$ the sum of all the small contributions reflected from along the length of the network becomes zero, and a steady state is set up. This statement is true if second order reflection set up by scattering from each of the small first order reflections alone taken into account in the analysis are so small as to be negligible.

Subject to these conditions holding the resultant wave-form of potential developed across the impedance 11 will be given by $$-\frac{1}{2} \log \frac{f\left(T-\frac{t}{2}\right)}{f(0)}$$

and as before the impedance 11 may be a load impedance fed from said network.

The above analysis has been developed for potential waves, but the formulae obtained hold equally well for current waves if the sign of the scattered waves is changed. Thus, for current waves in the above formulae where the terms $$\frac{1}{2} \log \frac{f\left(\frac{t}{2}\right)}{f(0)} \text{ and } \frac{1}{2} \log \frac{f\left(T-\frac{t}{2}\right)}{f(0)}$$

occur, the signs of these terms will be reversed.

Figure 4 shows a waveform conforming to the analysis given above, the waveform being that of the potential difference developed across the impedance 11 of Figure 1.

It is to be noted that the sense of reflection at the misterminated end does not affect the sense of the scattered waves arriving back at the source, since in so far as these waves are affected by the end reflection their final sense is determined by two reflections at the misterminated end.

In the above calculations it will be appreciated that it has been assumed that the distribution of impedance along the network is one that is comparatively flat, that is to say, slowly varying. If the distribution of impedance departs largely from this form, it will be necessary to take into account reflections of higher order than the first. It is believed, however, that the form of pulse obtained by ignoring second and higher order reflections is accurate for times between O and $T$ for comparatively large deviations of impedance distribution from the slowly varying form. By examining the discrepancy between the calculated power dissipated in the load and the charge stored in the condensers it would appear that second and higher order reflections will add terms in $$\left[\log \frac{f\left(\frac{t}{2}\right)}{f(0)}\right]^n$$

where $n$ is the order of the reflection, these terms being necessary to give correct power conditions. It would, further, appear that the even-order reflections cannot alter the wave shape during the period O to $T$ so that for this period the error in the analysis given above begins for third order reflections.

Figure 5 shows a waveform generated as described above wherein the otherwise matched load is shunted by the inductance of a transformer and it is required that the current to the load, assumed to be resistive, should be of flat-topped waveform, despite the magnetising current taken by the transformer. Curve 1 represents the current pulse shape required through the load; curve 2 represents the magnetising current of the transformer; and curve 3 represents the required current output of the apparatus according to the invention. Since the voltage developed across the load is to be constant, it follows that the network should be so designed as to give an output into a matched load such as that represented by curve 4, namely, a mean between curve 1 and curve 3. For small departures from the distribution of impedance where the impedance is constant along its length a network designed to generate a pulse represented by the mean curve 4 should give the required current waveform. If the curve 4 is represented by $\phi(t)$ where $t$ is the time from the start of the pulse, then equating $\phi(t)$ to the output wave calculated according to the analysis given above, an equation for the impedance distribution $$f\left(\frac{t}{2}\right)$$

of the network is given as $$1 - \frac{1}{2} \log \frac{f\left(\frac{t}{2}\right)}{f(0)} = \frac{\phi(t)}{\phi(0)}$$

and thus $$f\left(\frac{t}{2}\right) = f(0) e^{-2\left(\frac{\phi(t)}{\phi(0)} - 1\right)}$$

This defines the ratio of characteristic impedance at the point where the delay is $$\frac{t}{2}$$

to the surge impedance at the end to which the load is connected. The input characteristic impedance may be chosen as the ratio of the required load voltage to the mean total required current, that is to say, the current represented by the mean ordinate of curve 3. If the required waveform is one of potential the above formula may be used with the sign of the index of the exponential changed to be positive.

Figures 6 and 7 illustrate two embodiments of the invention where a modulating pulse is applied through a transformer 16 to a high frequency oscillator such as a magnetron 17.

In Figure 6 a stepped wave is applied periodically to the network 10 by means of a gas or vapor tube 12, such as a thyratron, and a voltage source 12a. A trigger pulse applied to the grid of tube 12 causes it to break down, thus applying the stepped wave. The reflected voltage of reversed polarity extinguishes the tube 12.

In Figure 7 a direct-current voltage is applied by way of a choke coil 18 to the network 10 to charge it. The network 10 is discharged periodically through a thyratron or the like indicated at 19.

The invention is also of application where a thyratron or other device liable to damage by excessive initial rates of rise of current therethrough is used to discharge a delay network which affords a source of energy for the "thyratron." If a flat-topped current pulse output is required from the network it is advantageous to subdivide the network into very many sections. In these circumstances, when the "thyratron" fires, the rate of rise of current in the thyratron is liable to be very rapid and thus likely to damage the thyratron. This rapid rise can be prevented by inserting an inductance between the network and the thyratron so as to limit the rate of rise of current to the prescribed safe value for the thyratron. However, such an inductance causes the wave front of the generated impulse to approach the flat-topped condition exponentially so that a long period must elapse before a substantially flat-topped wave is obtained. This difficulty can be avoided according to the invention by inserting a delay network composed of a number of graded sections between the said inductance and the network which provides the energy source. These sections will comprise inductances that diminish exponentially from the value of the first inductance to preferably the value of inductance employed in the network which provides the source, the time delay of all sections both of the latter network and graded network being chosen to be the same. A current wave will then be obtained which rises more or less uniformly towards the maximum current through the thyratron. In practice a true exponential distribution is not strictly correct, but serves as a guide, the values being adjusted if desired by trial and error to give the required waveform through the thyratron. In this example of the invention it will be appreciated that the load and source are disposed at opposite ends of the line with the load at the misterminated end.

The manner in which the invention functions in the example just described may be understood as follows: when the "thyratron" fires a current impulse of step form commences to propagate along the inserted network from the end at which the "thyratron" is connected towards that at which the network which provides the source is connected. As the impulse proceeds up the tapered line it encounters a continually decreasing impedance. From every point along the network which the impulse has passed there flows back therefore to the "thyratron" a reflected current of like sign to the propagating impulse. The current in the "thyratron" which initially is small on account of the large mismatch between its own low impedance and the impedance of the tapered network presented to it is thus built up by an increasing number of increments by reflection along the tapered network. These increments are not equal to the reflected currents reflected back to the "thyratron" but are the transmitted fraction thereof permitted by the substantial reflection that occurs at the "thyratron" termination by reason of said large mismatch. The reflected currents at the "thyratron" termination are however returned repeatedly by reflection along the length of the tapered network and each time in such sense as to augment the "thyratron" current, and this continues until all reflections have died out. By suitably choosing the distribution of impedance along the tapered network the increments fed to the "thyratron" due to the resulting system of reflections may be made to build up the "thyratron" current in a safe and desired manner, it being appreciated that owing to the mismatch of impedance between the "thyratron" and the tapered network and the consequent substantial reflections which thereby result the current which is initially applied to the "thyratron" when the latter fires and before the steady state is reached is reduced compared with what the current would have been if there were no tapered network and if a tapered network were used which was matched to the "thyratron," this reduction in current being desired for the safe operation of the "thyratron."

It will be understood that although the invention has been described especially with regard to generating flat-topped or sloping-topped pulses, curve-topped pulses may be developed from the network having varied constants along its length. The invention is also not limited to the application to the network of step-type pulses, since other shapes of pulses may be applied to the network.

The term "delay network" used herein is intended to include a cable used as a delay network.

The term "vapor tube" used in the claims is intended to include tubes filled with either gas or vapor.

What is claimed is:

1. A pulse producing circuit comprising a waveforming delay network having a plurality of sections, each section having series inductance and shunt capacitance, said network having a reflecting termination at one end and a non-reflecting termination at the other end, a load circuit connected to said non-reflecting end, means for changing an electrical charge on said network periodically whereby periodic pulses are supplied to said load circuit, a plurality of said sections having different surge impedances than the remaining sections whereby a pulse is obtained that departs from a flat-topped wave form in accordance with the adjustment of said plurality of sections.

2. The invention according to claim 1 wherein the surge impedance of each section increases progressively from one end of the network to the other end of the network whereby a pulse is obtained that has a sloping top.

3. Apparatus according to claim 1 wherein said means for changing an electrical charge and said load circuit are connected to one end of said network and wherein they have impedance values such as to terminate said network in its own impedance at said one end.

4. Apparatus according to claim 3 wherein said means for changing the electrical charge comprises means for applying energy of stepped wave form to said network and wherein the characteristic impedance of said network slowly varies along its length and wherein for the purpose of developing across said impedance a waveform represented by $\phi(t)$ at time $t$ after the application of a variation or impulse, the ratio of the characteristic impedance of said network at any point distant from the terminated end of the network by a delay time $$\frac{t}{2}$$

to the surge impedance at said terminated end is:

$$f\left(\frac{t}{2}\right) = f(0) e^{\pm 2\left(\frac{\phi(t)}{\phi(0)} - 1\right)}$$

where the positive or negative sign is taken according as said derived waveform is of current or of potential respectively, where $\phi(0)$ represents the wave form at the terminated end of the network, and where $e$ is the base of natural logarithms.

5. Apparatus according to claim 4 wherein the characteristic impedance of said network increases substantially exponentially from said one end to said other end.

6. In combination, a wave-forming delay network comprising a plurality of sections each having series inductance and shunt capacitance, a direct-current source for charging said network, a load circuit, means including a vapor tube for discharging said network periodically through said load circuit, a plurality of said sections having different surge impedances than the remaining sections whereby a pulse is obtained that departs from a flat-topped waveform in accordance with the adjustment of said plurality of sections.

7. In combination, a wave-translating device having the characteristic that a flat-topped voltage pulse applied to its input circuit appears across its output circuit with the top of the pulse distorted in shape, and means for applying to said input circuit a pulse having its top distorted in a shape substantially complementary to said first-mentioned distortion whereby a flat-topped pulse appears across said output circuit, said last means comprising a wave-forming delay network having a reflecting termination at one end and comprising a plurality of sections each having series inductance and shunt capacitance, and a load circuit including said wave-translating device connected across the other end of said network and terminating said network substantially in its surge impedance, a plurality of said sections having different surge impedances than the remaining sections whereby a pulse is obtained that departs from a flat-topped waveform in accordance with the adjustment of said plurality of sections.

8. In combination, a transformer having the characteristic that a flat-topped voltage pulse applied to its primary appears across its secondary with the top of the pulse sloping in one direction, and means for applying to said primary a pulse having its top sloping in the opposite direction whereby a flat-topped pulse appears across said secondary, said last means comprising a waveforming delay network having a reflecting termination at one end and comprising a plurality of sections each having series inductance and shunt capacitance, a direct-current source for charging said network, a load circuit including said transformer connected across the other end of said network and terminating said network substantially in its surge impedance, means including a vapor tube for discharging said network periodically through said load circuit, a plurality of said sections having different surge impedances than the remaining sections whereby a sloping-topped pulse is applied to said primary.

9. A pulse producing circuit comprising a waveforming delay network having a plurality of sections, each section having series inductance and shunt capacitance, said network having a reflecting termination at one end and a non-reflecting termination at the other end, a load circuit connected to said non-reflecting end, means for changing an electrical charge on said network periodically whereby periodic pulses are supplied to said load circuit, one of said sections having a different surge impedance than the remaining sections whereby a pulse is obtained that departs from a flat-topped waveform in accordance with the adjustment of said one section.

DOREEN WALKER,
*Executrix of Alan Dower Blumlein, Deceased.*

REFERENCES CITED

The following references are of record in the file of this patent:

UNITED STATES PATENTS

| Number | Name | Date |
|---|---|---|
| 2,018,320 | Roberts | Oct. 22, 1935 |
| 2,179,607 | Bedford | Nov. 14, 1939 |
| 2,188,970 | Wilson | Feb. 6, 1940 |
| 2,227,021 | Schlesinger | Dec. 31, 1940 |
| 2,420,302 | Darlington | May 13, 1947 |
| 2,420,309 | Goodall | May 13, 1947 |